US010298023B2

(12) United States Patent
Liao et al.

(10) Patent No.: US 10,298,023 B2
(45) Date of Patent: May 21, 2019

(54) UNIVERSAL POWER CONVERTER HAVING VARIABLE VOLTAGE CAPABILITY AND METHOD THEREFOR

(71) Applicant: Dell Products, LP, Round Rock, TX (US)

(72) Inventors: Tsung-Cheng Anson Liao, Taoyuan (TW); Wei-Cheng Jason Yu, Taipei Tucheng (TW); Yang Wang, New Taipei (TW); Tso-Jen Hunter Peng, New Taipei (TW)

(73) Assignee: Dell Products, LP, Round Rock, TX (US)

( * ) Notice: Subject to any disclaimer, the term of this patent is extended or adjusted under 35 U.S.C. 154(b) by 131 days.

(21) Appl. No.: 14/865,964

(22) Filed: Sep. 25, 2015

(65) Prior Publication Data

US 2017/0093165 A1    Mar. 30, 2017

(51) Int. Cl.
| | |
|---|---|
| *H02J 3/00* | (2006.01) |
| *H02J 5/00* | (2016.01) |
| *H02M 7/48* | (2007.01) |
| *H02M 3/156* | (2006.01) |
| *H02J 1/10* | (2006.01) |
| *H02M 3/158* | (2006.01) |
| *H02M 1/00* | (2006.01) |

(52) U.S. Cl.
CPC .................. *H02J 5/00* (2013.01); *H02M 7/48* (2013.01); *H02J 1/102* (2013.01); *H02M 3/156* (2013.01); *H02M 3/158* (2013.01); *H02M 2001/007* (2013.01); *H02M 2001/0032* (2013.01); *H02M 2007/4815* (2013.01); *Y02B 70/1441* (2013.01); *Y02B 70/16* (2013.01); *Y10T 307/707* (2015.04)

(58) Field of Classification Search
None
See application file for complete search history.

(56) References Cited

U.S. PATENT DOCUMENTS

| | | | | |
|---|---|---|---|---|
| 5,615,162 | A * | 3/1997 | Houston ................ | G11C 5/14 |
| | | | | 365/226 |
| 5,886,561 | A * | 3/1999 | Eitan ..................... | H02J 9/061 |
| | | | | 307/64 |
| 5,910,750 | A * | 6/1999 | Harada .................. | G06F 1/32 |
| | | | | 327/530 |
| 6,259,304 | B1 * | 7/2001 | Sheng ................... | G06F 1/3203 |
| | | | | 327/408 |
| 7,170,197 | B2 * | 1/2007 | Lopata .................. | G06F 1/263 |
| | | | | 307/70 |
| 7,800,433 | B2 * | 9/2010 | Yoshikawa ........... | H03K 17/693 |
| | | | | 327/530 |

(Continued)

*Primary Examiner* — Tuan T Lam
(74) *Attorney, Agent, or Firm* — Larson Newman, LLP

(57) ABSTRACT

A power supply includes an LLC resonant power converter to provide a first reference signal having a first voltage. The power supply also includes a DC-DC power converter to provide a second reference signal having a second voltage. The DC-DC converter receives power from the first reference signal. The power supply further includes a switch circuit including a first input to receive the first reference signal, a second input to receive the second reference signal, an input to receive a switch control message, and an output coupled to a power rail. The switch circuit is configured to connect the first reference signal and the second reference signal to the power rail based on the switch control message.

15 Claims, 4 Drawing Sheets

(56) References Cited

U.S. PATENT DOCUMENTS

| | | | |
|---|---|---|---|
| 8,225,125 B2* | 7/2012 | Yu | H03K 17/693 |
| | | | 713/300 |
| 8,681,513 B2 | 3/2014 | Reddy | |
| 2006/0061930 A1* | 3/2006 | Chou | H02J 1/102 |
| | | | 361/118 |
| 2009/0251205 A1* | 10/2009 | Lin | G06F 1/3203 |
| | | | 327/544 |
| 2010/0123450 A1 | 5/2010 | Reddy et al. | |
| 2010/0253148 A1* | 10/2010 | Matsui | H02J 1/08 |
| | | | 307/75 |
| 2011/0090717 A1 | 4/2011 | Lee et al. | |
| 2014/0117755 A1* | 5/2014 | Chen | H02J 3/1892 |
| | | | 307/22 |
| 2014/0347005 A1* | 11/2014 | Zhou | H02J 7/007 |
| | | | 320/107 |
| 2015/0253827 A1* | 9/2015 | Yanagidaira | G06F 1/3287 |
| | | | 713/300 |
| 2015/0309522 A1* | 10/2015 | Fang | G05B 15/02 |
| | | | 700/22 |
| 2017/0060209 A1* | 3/2017 | Volek | G06F 1/266 |

* cited by examiner

UNIVERSAL POWER CONVERTER HAVING VARIABLE VOLTAGE CAPABILITY AND METHOD THEREFOR

FIELD OF THE DISCLOSURE

This disclosure generally relates to information handling systems, and more particularly relates to a universal power converter having variable voltage capability to provide power to an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-5 illustrate a universal power converter for providing a configurable supply voltage to an information handling system or to another type of electronic device. For example, an information handling system may utilize a twelve volt supply voltage for normal operation, but require only a five volt supply voltage when the system transitions operation into a standby state. The universal power converter utilizes two or more types of power conversion circuitry, including an LLC (inductor-inductor-capacitor) resonant power converter, and one or more DC-to-DC power converters. Each converter is configured to provide power at a specific voltage and current. In one embodiment, either an output of an LLC converter or an output of a DC-DC converter can be selectively coupled to a power delivery rail of a universal serial bus (USB) type-C connector by a switch circuit included at the universal power converter. The DC-DC converter receives power from the LLC converter. A device that is receiving power from the universal power converter can command the converter to enable delivery of power from the LLC converter or from the DC-DC converter. The command can be propagated to the universal power converter via a communication channel of the USB type-C connector. The power converter responds to the command by configuring the switch circuit to select the desired power converter, thereby providing the requested operating voltage.

Figure 1:
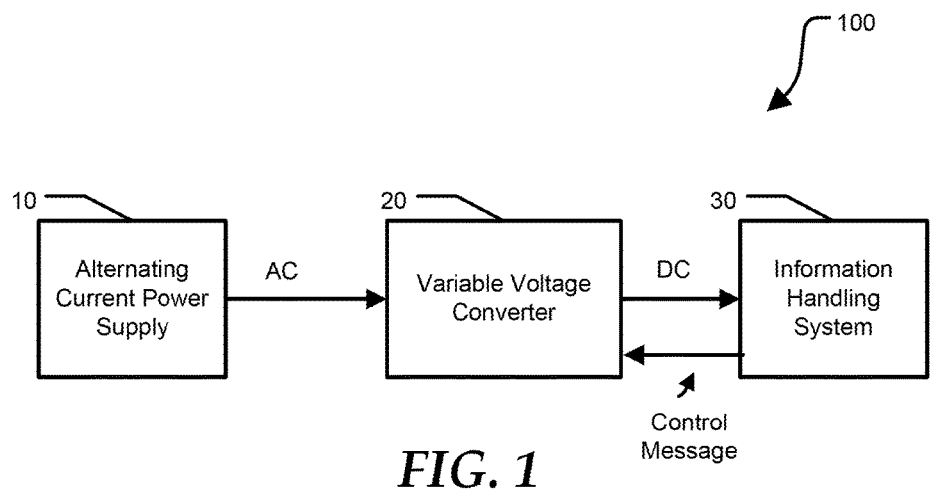
FIG. 1 is a block diagram illustrating a system including a variable voltage module according to a specific embodiment of the present disclosure.

FIG. 1 shows a system 100 including a variable voltage converter 20 according to a specific embodiment of the present disclosure. System 100 includes an alternating current (AC) power supply 10, a variable voltage converter 20, and an information handling system 30. Variable voltage converter 20 is configured to convert AC power that is received from AC power supply 10 into direct current (DC) power that is suitable to operate information handling system 30. Variable voltage converter 20 is configured to provide DC power at two or more voltage levels. In particular, variable voltage converter 20 includes an input to receive a control message from information handling system 30. The control message instructs variable voltage converter 20 to provide DC power at a specific voltage level. For example, System 30 can issue a control message to converter 20, requesting converter 20 to provide twelve volts to support normal operation of system 30, or five volts to support a standby mode of operation of system 30.

Variable voltage converter 20 includes an LLC (inductor-inductor-capacitor) topology resonant power converter that is optimized to efficiently provide power at a single regulated voltage level. In particular, this level of optimization precludes reconfiguring the LLC converter from providing an alternate voltage level. Variable voltage converter 20 also includes a DC-to-DC (DD-DC) converter that is configured to provide power at a voltage that is different than the voltage level provided by the LLC converter. The DC-DC converter receives power from an output of the LLC converter. The voltage level provided by the DC-DC converter can be less than or greater than the voltage level provided by the LLC converter.

For purpose of this disclosure an information handling system 30 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 30 can include processing resources for executing machine-executable code, such as a CPU, a programmable logic array (PLA), an embedded device such as a System-on-a-Chip (SoC), or other control logic hardware. Information handling system 30 can also include one or more computer-readable medium for storing machine-executable code, such as software or data.

Figure 2:
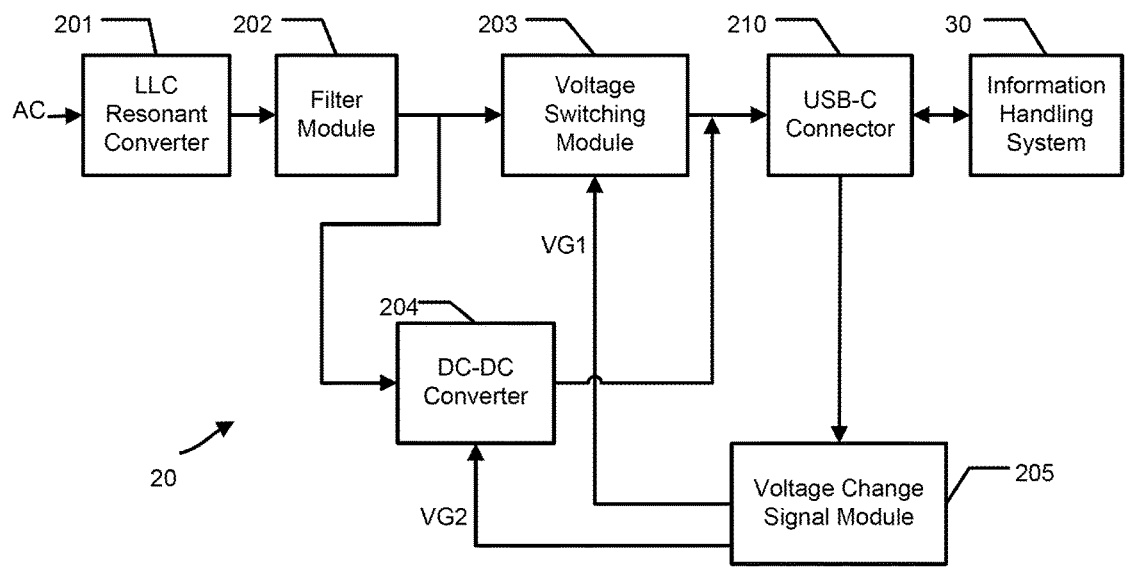
FIG. 2 is a block diagram illustrating the variable voltage module of FIG. 1 according to a specific embodiment of the present disclosure.

FIG. 2 is a block diagram illustrating the variable voltage converter 20 of FIG. 1 according to a specific embodiment of the present disclosure. Converter 20 includes an LLC resonant converter 201, a filter module 202, a voltage switching module 203, a DC-DC converter 204, and a voltage change signal module 205. In a particular embodiment, variable voltage converter 20 can be connected to information handling system 30 via a universal serial bus (USB) type-C connector 210. The USB type-C connector and corresponding receptacle are compliant with an industry-standard USB interface specification, such as USB 3.1, USB type C, USB PD (power delivery), and the like. The techniques disclosed herein are applicable to a power adapter that is external to a device that is receiving power from the adapter, as well as to a power supply that is incorporated within an electronic device. Furthermore, while the present disclosure is described in a context that includes a USB type-C connector, another type of connector, or a hardwired interface between variable voltage converter 20 and information handling system 30 can be utilized without departing from the scope of the present disclosure.

LLC resonant converter 201 includes an LLC topology that allows for zero voltage switching of transistor switches that drive an included transformer. Compared to a conventional series resonant converter, a primary inductance of the included transformer is reduced in value such that the transformer inductance now impacts the resonant network. As a result, a wide load range can be supported by a smaller range of switching frequencies relative to the series resonant topology. Furthermore, the LLC topology exhibits a gain greater than one at an optimally configured output voltage level, providing improved voltage regulation and operating efficiency across a range of loads.

DC-DC converter 204 can include a buck converter, a buck-boot converter, a boost converter, or another type of DC-to-DC converter. DC-DC converter 204 receives power from the output of LLC resonant converter 201, and transforms the voltage level provided by LLC converter 201 to another voltage level, either higher or lower than the voltage provided by LLC converter 201. For example, LLC resonant converter 201 can be designed to provide optimal performance when delivering twelve volts, while DC-DC converter 204 can be designed to provide five volts. In other words, DC-DC converter 204 converts twelve volts DC provided by LLC converter 201 to five volts DC. The voltages described herein are merely examples, and LLC converter 201 can be designed to provide another fixed voltage level, as can DC-DC converter 204.

Filter module 202 is configured to filter power provided by LLC converter 201, for example to reduce high frequency noise that may be superimposed on the DC output of converter 201. Voltage switching module 203 is configured to selectively couple the output of the filter module to a power rail of USB-C connector 210 based on a logic state of signal SG1. Signal SG1 is provided by voltage change signal module 205, which also provides signal SG2 to DC-DC converter 204. For example, signal SG1 can configure voltage switching module 203 to transmit the filtered output of LLC converter 201 to a power rail pin at USB-C connector 210, or to interrupt said transmission. Similarly, signal SG2 is configured to enable or disable transmission of power from DC-DC converter 204 to the power rail pin at USB-C connector 210.

Signals SG1 and SG2 are generated by the voltage change signal module 205 based on messages received from information handling system 30, via USB-C connector 210, via another interconnect, or via a hardwired connection. In an embodiment, messages provided by system 30 can be transmitted via configuration channels CC1 and/or CC2 provided by USB-C connector 210. The messages can be encoded using bi-phase marked encoding/decoding (BMC), binary frequency-shift keying (BFSK), or another standard or proprietary communication protocol.

During operation, an electronic device receiving power from variable voltage converter 20, such as system 30, can issue a request to converter 20 specifying a desired voltage to be provided by converter 20. For example, information handling system 30 can send a message to voltage change signal module 205, via USB-C connector 210, requesting variable voltage converter 20 to provide twelve volts, in which case signal module 205 configures voltage switching module 203 to couple the output of LLC converter 201 and filter module 202 to a power rail at USB-C connector 210, while disabling the output of DC-DC converter 204. Alternatively, system 30 can send a message to voltage change signal module 205, via USB-C connector 210, requesting variable voltage converter 20 to provide five volts, in which case signal module 205 configures voltage switching module 203 to disconnect the output of LLC converter 201 and filter module 202 from the power rail at USB-C connector 210, while enabling the output of DC-DC converter 204 to provide five volts to the power rail at USB-C connector 210.

Figure 3:
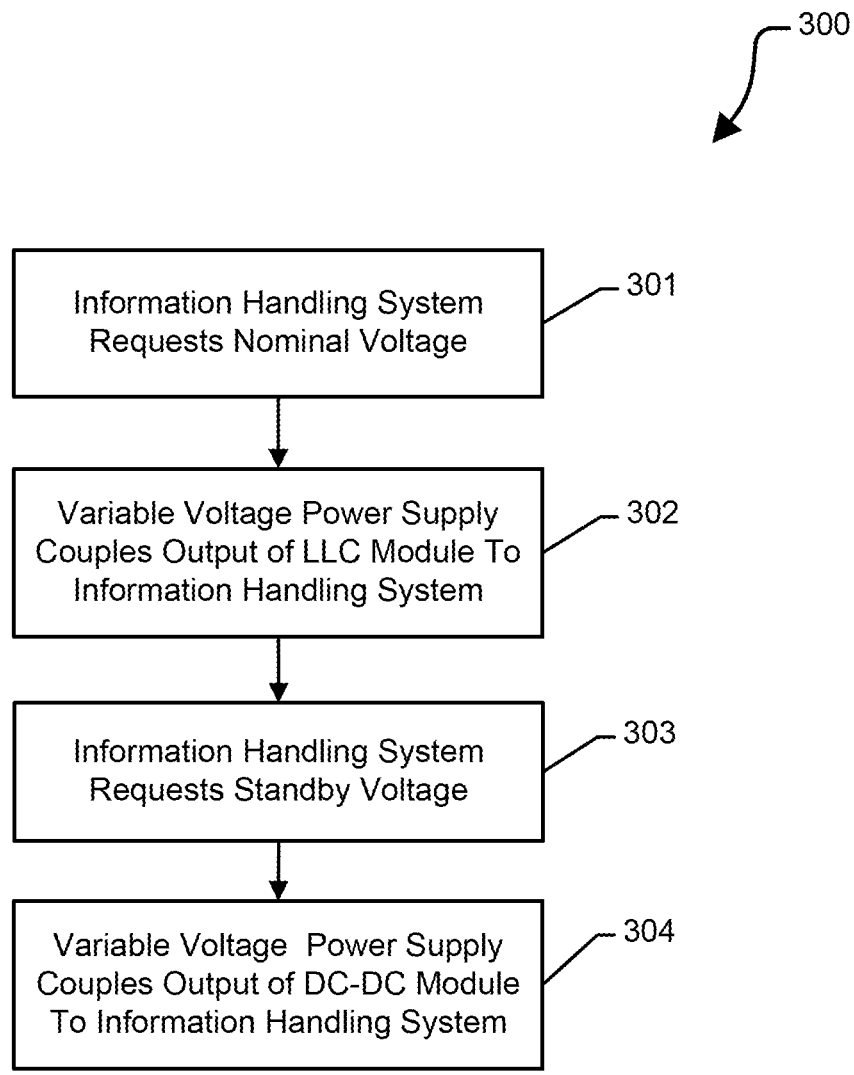
FIG. 3 is a flow diagram illustrating a method according to a specific embodiment of the present disclosure.

FIG. 3 is a flow diagram illustrating a method 300 according to a specific embodiment of the present disclosure. Method 300 shows how an information handling system can configure a variable voltage power supply to provide a desired output voltage level. The method begins at block 301 where an information handling system requests a nominal supply voltage. For example, system 30 can send a message to variable voltage converter 20 requesting that the converter provide eighteen volts to a power rail, such as a power pin at USB-C connector 210. The method continues at block 302 where the power supply couples the output of an LLC resonant converter to the information handling system. For example, system 30 can transmit a message to voltage change signal module 205 via a configuration channel of USB-C connector 210. Signal module responds by activating voltage switching module 203, which couples the output of LLC converter 201 to system 30.

The method continues at block 303, where the information handling system requests a standby voltage. For example, system 30 may support a low-power mode of operation, where five volts is sufficient. The method completes at block 304 where the variable voltage power supply de-couples the LLC converter from the power rail, and activates a DC-DC converter to instead provide power to the power rail. For example, voltage change signal module 205 can configure signals SG1 and SG2 to decouple the output of LLC converter 201 and filter module 202 from the power rail, and to configure DC-DC converter 204 to supply power to the power rail. Method 300 illustrates a power supply capable of providing two different supply voltages. One of skill will appreciate that additional LLC converters and/or DC-DC converters can be included at variable voltage converter 20, thereby providing more than two alternative voltage levels.

Figure 4:
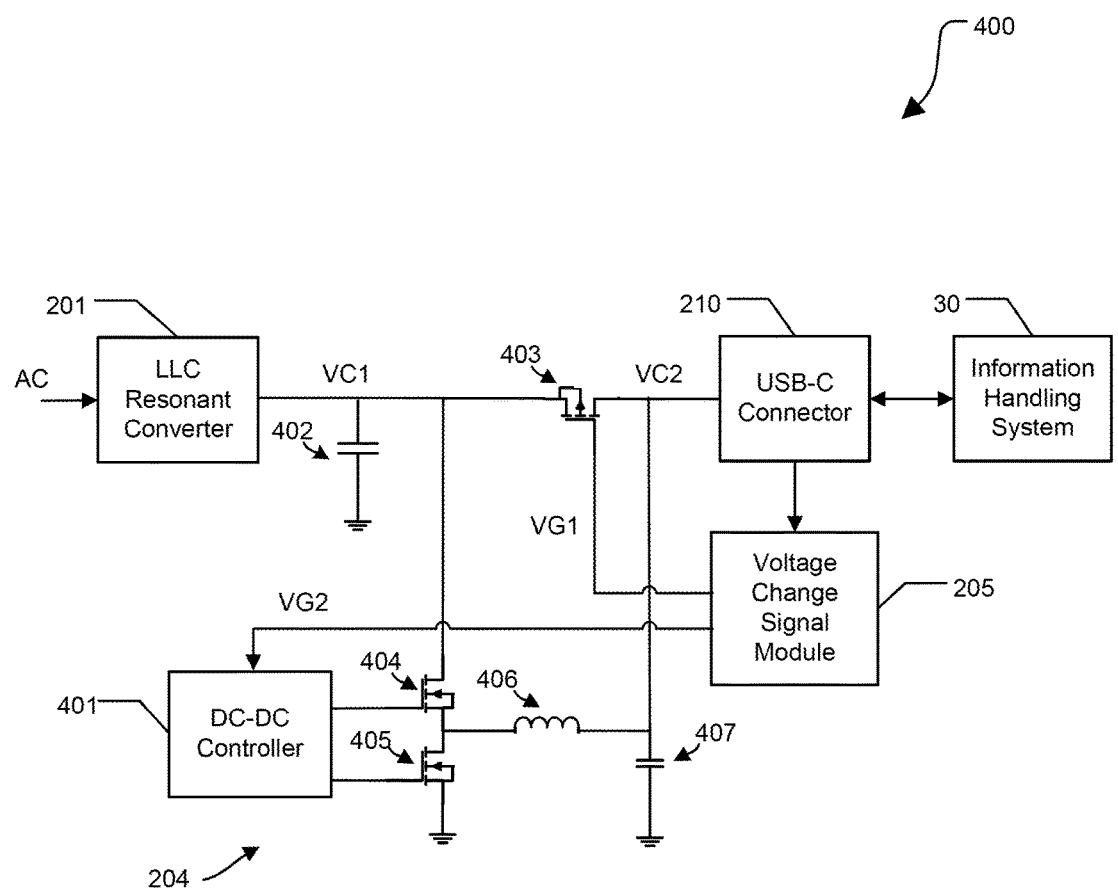
FIG. 4 is a schematic diagram illustrating the variable voltage module of FIG. 1 according to a specific embodiment of the present disclosure.

FIG. 4 is a schematic diagram 400 illustrating the variable voltage converter 20 of FIG. 1 according to a specific embodiment of the present disclosure. Schematic diagram 400 includes LLC resonant converter 201, a DC-DC converter 204 that includes a DC-DC controller 401, a capacitor 402, MOSFETs 404 and 405, an inductor 406, and a capacitor 407; a MOSFET 403, a voltage change signal module 205, USB type C connector 210, and information handling system 30. Filter module 202 is implemented by capacitor 402, which filters the output of LLC resonant converter 201. Voltage switching module 203 is implemented by MOSFET 403, which is is configured to conduct when a gate voltage provided by signal VG1 is set to a ground potential, thereby coupling the output of LLC converter 201, node VC1, to node VC2. When signal VG1 is set to a logic-high level, MOSFET 403 is turned off, disconnecting LLC converter 201 from node VC2. DC-DC controller 401, MOSFETS 404 and 405, inductor 406, and capacitor 407 together provide a DC-DC power converter, such as DC-DC converter 204. When signal SG2 is activated, DC-DC controller 401 is enabled, and when signal SG2 is at a ground potential, DC-DC controller 401 is disabled. When enabled, DC-DC controller provides pulse-width modulated (PWM) signals to the gate terminals of MOSFETs 404 and 405. Based on a duty cycle and timing of the PWM signals, a DC voltage is provided to node VC2.

As described above, voltage change signal module 205 is configured to receive messages from information handling system 30 via a configuration channel interface of USB-C connector 210. The messages are interpreted by signal module 205, which activate signals VG1 and VG2 accordingly to select either LLC resonant converter 201 or DC-DC converter 204 to supply power to node VC2.

Figure 5:
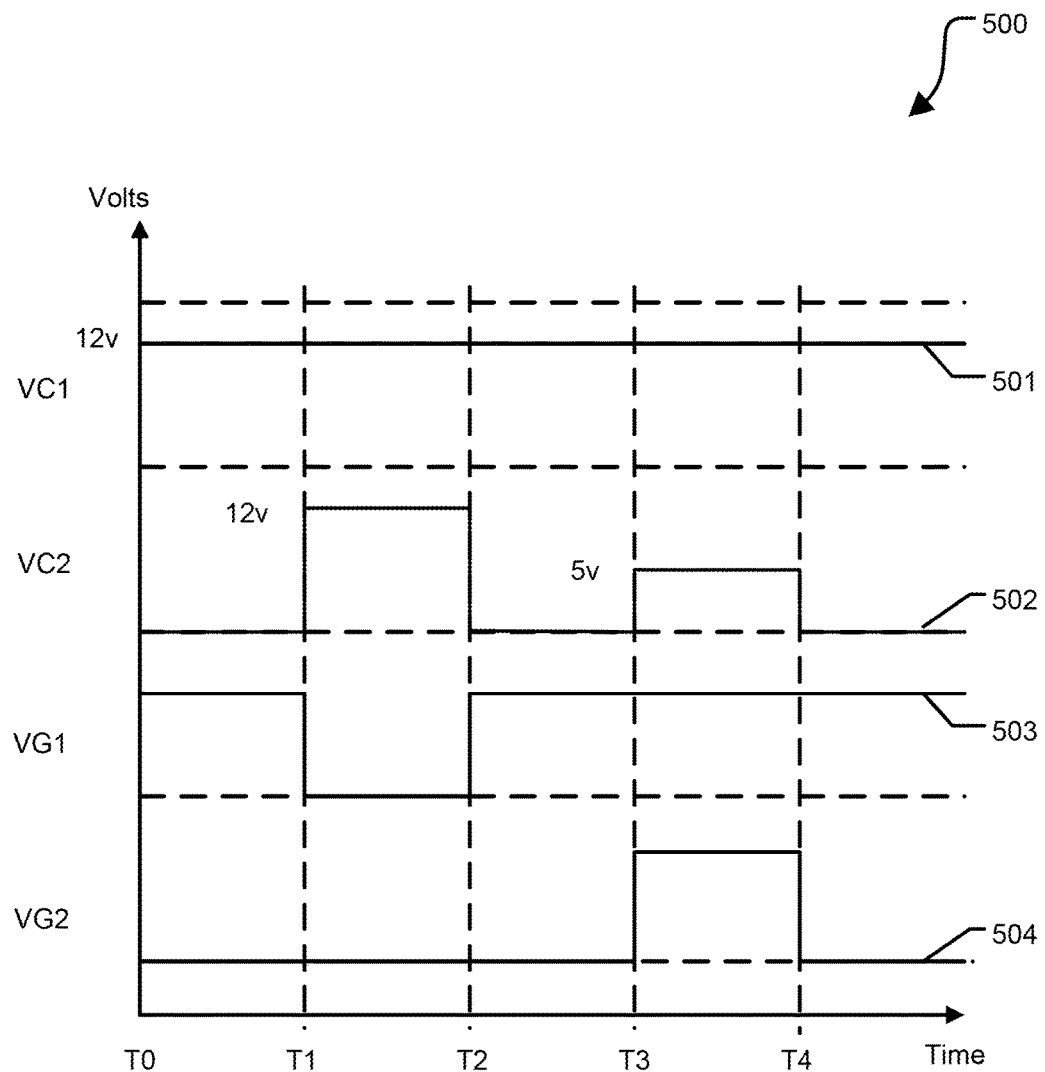
FIG. 5 is a timing diagram illustrating operation of the variable voltage module of FIG. 1 according to a specific embodiment of the present disclosure.

FIG. 5 is a timing diagram 500 illustrating operation of the variable voltage converter 20 of FIG. 1 according to a specific embodiment of the present disclosure. Timing diagram 500 corresponds to schematic 400 of FIG. 4 and includes a horizontal axis representing time, and a vertical axis representing voltage. Timing diagram 500 includes a voltage at node VC1 identified by reference 501, a voltage at node VC2 identified by reference 502, a voltage at node VG1 identified by reference 503, and a voltage at node VG2 identified by reference 504. Note that node VC1 remains powered, for example at a twelve volt potential. This is because LLC converter 201 can either provide power to system 30, or it can provide power to the input of DC-DC converter 204. At time T0, signal VG1 is at a logic-high level so MOSFET 403 is non-conducting, and signal VG2 is at a ground potential, so DC-DC controller 401 is disabled. Consequently, no power is provided by either LLC converter 201 or by DC-DC converter 204, and node VC2 remains at a ground potential.

At time T1, signal VG2 remains at a logic-low level, but signal VG1 transitions to a ground potential. Therefore, MOSFET 401 is now conducting, and DC-DC converter 204 is still disabled. Consequently, power provided by LLC converter 201 is provided to node VC2, and is coupled through USB-C connector 210 to information handling system 30. In this example, LLC converter 201 is configured to provide twelve volts to system 30. At time T2, signal VG2 remains at a ground level, and signal VG1 returns to a logic-high level. As a result, node VC2 returns to a ground potential because, once again, MOSFET 403 is OFF and DC-DC converter 204 is disabled. At time T3, signal VG1 remains at a logic-high level, and signal VG2 transitions to a logic-high level, thus enabling DC-DC converter 204, while MOSFET 403 remains OFF. Consequently, node VC2 transitions to a lower voltage provided by DC-DC converter 201. In this example, DC-DC converter 204 is configured to provide five volts to system 30. At time T4, signal VG1 remains at a logic-high state so MOSFET 403 remains OFF, and signal VG2 returns to a ground potential, disabling operation of DC-DC converter 204. Accordingly, node VC2 returns to a ground potential and power is no longer provided to information handling system 30.

Referring back to FIG. 1, the information handling system 30 can include a set of instructions that can be executed to cause the information handling system to perform any one or more of the methods or computer based functions disclosed herein. The information handling system 30 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 30 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 30 is illustrated, the term "system" shall also be taken to include any collection of systems or sub-systems that individually or jointly execute a set, or multiple sets, of instructions to perform one or more computer functions.

The information handling system 30 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within a system memory or another memory included at system 30, and/or within the processor during execution by the information handling system 30. The system memory and the processor also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A modular power supply to provide power to an information handling system, the modular power supply device comprising:
    an inductor-inductor-capacitor (LLC) resonant power converter having an input to receive an alternating current reference signal and an output to provide a first reference signal having a first voltage;
    a DC-DC power converter having an input to receive the first reference signal and an output to provide a second reference signal having a second voltage that is different than the first voltage;
    a switch circuit including a first input to receive the first reference signal, a second input to receive the second reference signal, a third input to receive a switch control message, and an output coupled to a power rail, the switch circuit to selectively enable coupling of the first reference signal and the second reference signal to the power rail based on the switch control message generated at the information handling system; and
    a universal serial bus (USB) type C connector to couple the power rail to an external power input at the information handling system and to couple the switch control message to the switch circuit via a configuration channel of the USB type C connector,
    wherein the switch circuit includes:
        a first transistor to selectively couple an output of the LLC resonant power converter to the power rail;
        a second transistor to selectively couple an output of the LLC resonant power converter to a first terminal of an inductor, a second terminal of the inductor coupled to the power rail; and
        a third transistor to selectively couple the first terminal of the inductor to a ground reference voltage.

2. The device of claim 1, wherein the switch circuit is further to disconnect both of the first reference signal and the second reference signal from the power rail based on the switch control message.

3. A method for providing power at a selectable voltage level to an information handling system, the method comprising:
    receiving a first message from the information handling system at a modular power supply, the first message received at a configuration channel of a universal serial bus (USB) type C connector, the first message requesting the modular power supply to provide power at a first voltage to a power rail coupled to an external input at the information handling system via the USB type C connector;
    selectively activating a first transistor in response to receiving the first message, the first transistor to couple an output of an inductor-inductor-capacitor (LLC) resonant power converter to the power rail, the LLC resonant power converter receiving an alternating current reference signal;
    receiving a second message from the information handling system at the modular power supply, the second message received at the configuration channel of the USB type C connector, the second message requesting the modular power supply to provide power at a second voltage to the power rail, the second voltage different than the first voltage; and
    selectively activating a second transistor and a third transistor in response to receiving the second message, the second transistor to couple an output of the LLC resonant power converter to the power rail via an inductor and the third transistor to couple the power rail to a ground reference voltage via the inductor.

4. The method of claim 3, wherein the first voltage corresponds to a nominal operating voltage of the information handling system receiving power from the modular power supply, and the second voltage corresponds to a standby operating voltage of the information handling system.

5. The method of claim 3, further comprising receiving the alternating current reference signal at an input of the modular power supply.

6. The method of claim 3, wherein the second voltage is less than the first voltage.

7. The method of claim 3, wherein the modular power supply provides greater than fifty watts of power.

8. The method of claim 3, further comprising:
receiving a third message at the modular power supply, the third message requesting the modular power supply to disable providing power at the power rail; and
disable coupling the output of the LLC resonant power converter and the output of the DC-DC power converter to the power rail in response to receiving the third message.

9. A method comprising:
providing a first message from an information handling system to a modular power supply, the first message requesting the modular power supply to provide power at a first voltage to a power rail, the power rail coupled to the information handling system via a universal serial bus (USB) type C connector, the first message received at the modular power supply via a communication channel interface provided by the USB type C connector;
receiving power at the first voltage at the information handling system in response to providing the first message, the power at the first voltage provided by an LLC resonant power converter included at the modular power supply by selectively activating a first transistor in response to the first message, the first transistor coupling the LLC resonant power converter to the power rail;
providing a second message from the information handling system to the modular power supply, the second message requesting the modular power supply to provide power at a second voltage to the power rail, the second voltage different than the first voltage, the second message received at the modular power supply via the communication channel interface provided by the USB type C connector; and
receiving power at the second voltage at the information handling system in response to providing the second message, the power at the second voltage provided by a DC-DC power converter included at the modular power supply, the DC-DC power converter receiving power from the LLC resonant power converter by selectively activating a second transistor and a third transistor in response to the second message, the second transistor coupling the LLC resonant power converter to the power rail via an inductor, and the third transistor coupling the power rail to a ground reference voltage via the inductor.

10. The method of claim 9, wherein the first message and the second message are encoded using bi-phase marked encoding/decoding.

11. The method of claim 9, wherein the first voltage corresponds to a nominal operating voltage of the information handling system receiving power from the modular power supply, and the second voltage corresponds to a standby operating voltage of the information handling system.

12. The method of claim 9, further comprising receiving the alternating current at an input of the modular power supply.

13. The method of claim 9, wherein the second voltage is less than the first voltage.

14. The method of claim 9, wherein the first message and the second message are encoded using binary frequency-shift keying.

15. The method of claim 9, further comprising:
providing a third message to the modular power supply, the third message requesting the power supply to disable providing power at the power rail.

* * * * *